Figure 4:
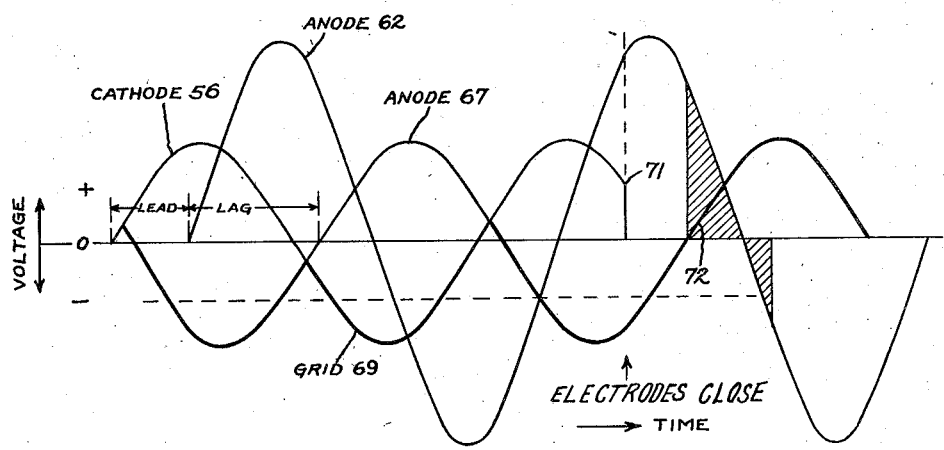

Sept. 30, 1952
M. E. BIVENS
2,612,579
COORDINATION CONTROL CIRCUIT
Filed Sept. 29, 1950
3 Sheets-Sheet 1
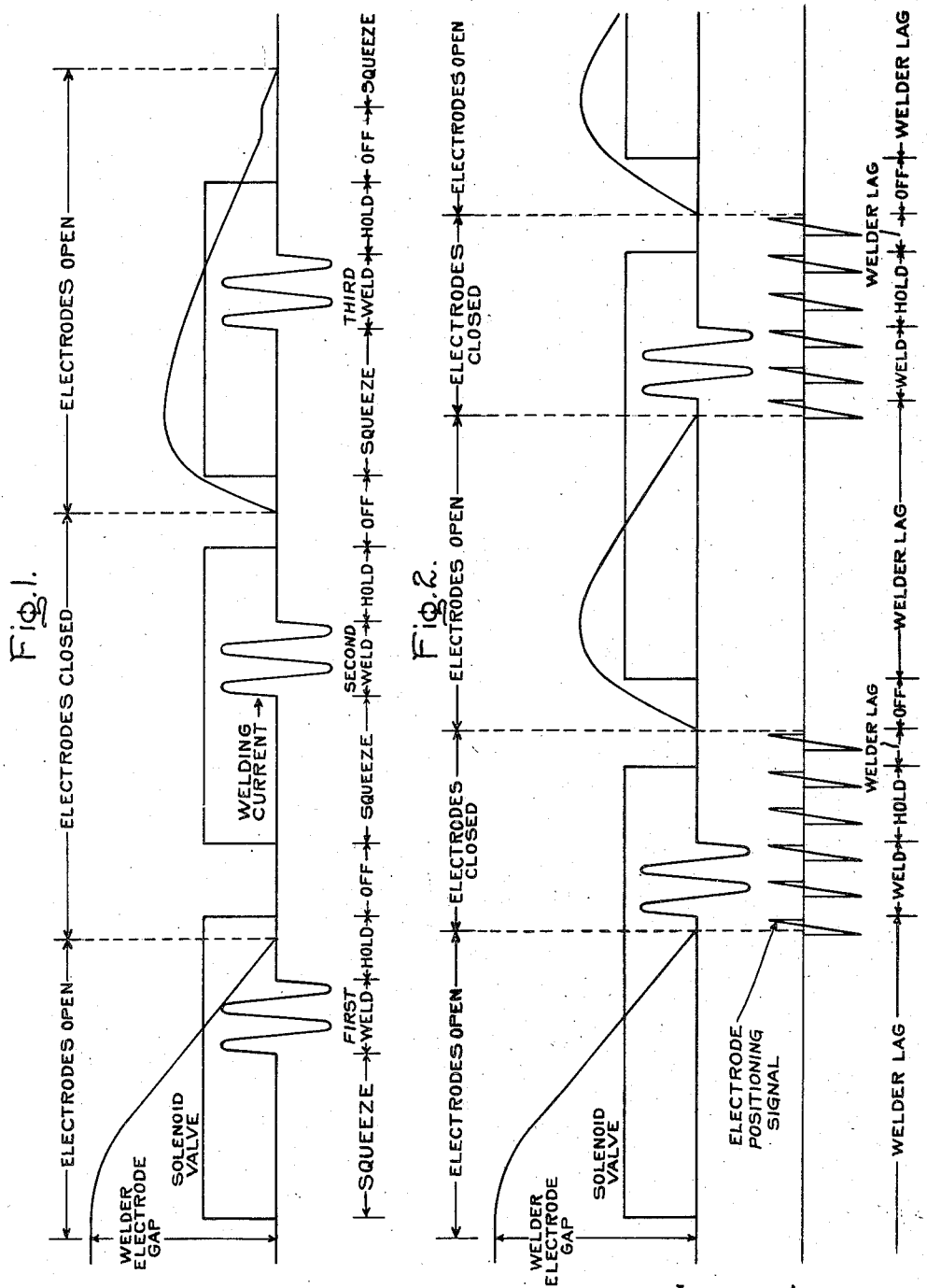
Inventor:
Maurice E. Bivens,
by Claude A. Matt
His Attorney.

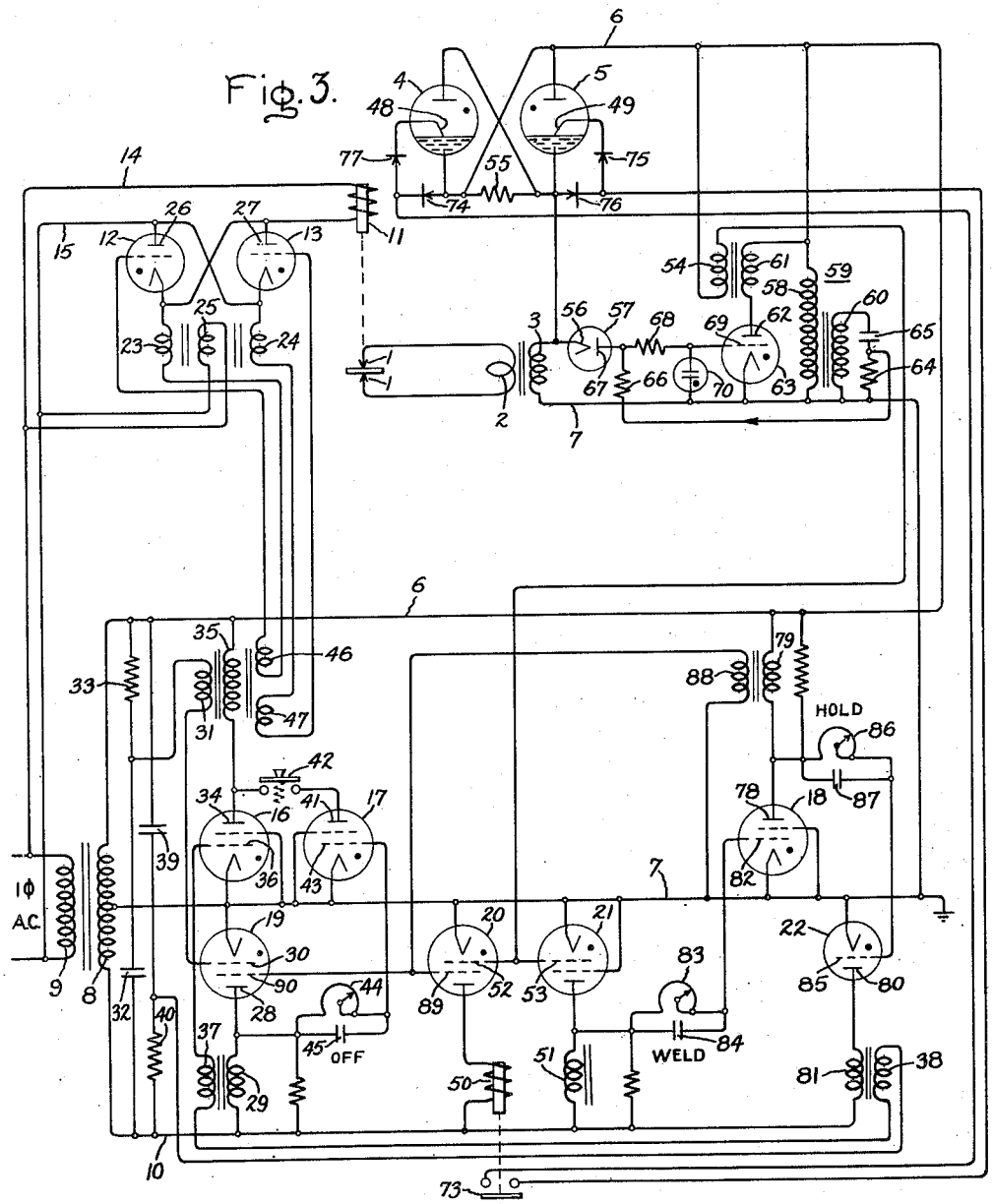

Sept. 30, 1952  M. E. BIVENS  2,612,579
COORDINATION CONTROL CIRCUIT
Filed Sept. 29, 1950  3 Sheets—Sheet 3

Inventor:
Maurice E. Bivens,
by *Claude H. Nutt*
His Attorney.

Patented Sept. 30, 1952

2,612,579

UNITED STATES PATENT OFFICE 2,612,579

COORDINATION CONTROL CIRCUIT

Maurice E. Bivens, Schenectady, N. Y., assignor to General Electric Company, a corporation of New York Application September 29, 1950, Serial No. 187,442

9 Claims. (Cl. 219—4)

This invention relates to control circuits and particularly to an electronic circuit for providing coordination between the sequencing controls and electrode closure in an electric resistance welding arrangement.

Present resistance welding technique involves careful timing of a plurality of sequential events leading to a satisfactory weld. With the advent of high speed precision welding, the timing of these events has been delegated to electronic circuits of greater and greater complexity. Present day electronic sequence control circuits have been designed to provide cascade timing of squeeze, weld, hold and off control functions with possible independent adjustments for the series of sequence time intervals. In the past the sequence control operation has been independent of the welding machine operation since the sequencing time intervals were sufficiently long for the mechanical operation of the welder to keep pace with the sequence control. During the past few years, there has been a growing trend toward higher welding rates, particularly for gun type welders, thus making it necessary to redesign the sequence controls to be capable of higher speed sequencing or more operations per unit time. The advent of high speed sequence control pointed up the lack of coordination between sequencing and the mechanical operations of the welder. Although the sequence control could be made fast operating, the welding equipment could not keep pace with the sequencing, thus causing erratic operation of the welder with the possibility of weld time intervals occurring while the welder electrodes were open. The indefinite timing of electrode closure inherent with mechanical electrode positioning equipment, and aggravated by electrode wear, indicates the need for some degree of coordination between the sequencing controls and the instant of electrode closure.

It is an object of my invention to provide an improved electronic control circuit.

Another object of my invention is to provide a device insuring coordination between electrode closure and sequencing controls in resistance welding apparatus.

It is a further object of my invention to provide an arrangement for timing welding sequence controls not only with respect to the instant of welding electrode closure onto the work but also with respect to the instant of electrode separation from the work.

It is still another object of my invention to provide an apparatus insuring coordination of the welding sequence controls with the welding electrode closure and the instantaneous phase of the welding voltage.

Figure 5:
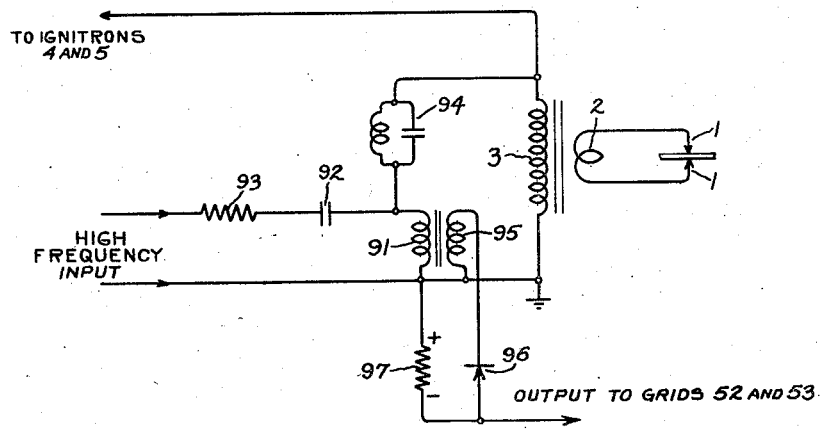

The novel features which I believe characteristic of my invention are set forth with particularity in the appended claims. My invention, however, both as to its organization and method of operation, together with further objects and advantages thereof, may best be understood by reference to the following description taken in connection with the accompanying drawings in which Fig. 1 illustrates graphically some difficulties encountered in attempting sequence control independent of positioning of the welding elecrodes. Fig. 2 illustrates graphically the relationship existing between a control signal indicative of the welder electrode positioning and the welding events. Fig. 3 shows in circuit diagram form an embodiment of my invention, Fig. 4 illustrates graphically the voltage conditions existing in the circuit arrangement of Fig. 3, and Fig. 5 shows in circuit diagram a modification of the invention applicable to the general circuit arrangement of Fig. 3.

Referring to Fig. 1, there is shown graphically the difficulties encountered in attempting to provide resistance welding sequence control independent of welding electrode positioning in the case of high speed sequencing. The cause of trouble indicated shows the first weld time occurring before the welder electrodes were completely closed causing need for a pressure switch or for dual squeeze time to provide a longer squeeze time for the first operation where the electrodes start from the fully retracted position. The welding time intended for the second weld occurred about the proper time for the first weld whereas the third weld time occurred while the electrodes were open.

Fig. 2 illustrates the inherent coordination of sequencing control and the welder accomplished by using an electrical sensing means which in effect, from the primary side, looks through the welding transformer and observes whether the welder electrodes are open or closed and provides a signal to the sequence control so that the capabilities of both the control and the welder may be fully used. The welding electrode positioning signal shown in Fig. 2 as occurring during the time of complete electrode closure is employed in a manner to be disclosed shortly to control initiation of the weld time, hold and off time upon electrode closure.

Briefly, applicant's invention as embodied in Fig. 3 of the drawings provides a succession of the following events upon coordination of the sequencing controls with the welding electrode positioning: The closure of the pilot initiating switch energizes the solenoid valve causing the electrodes to move toward the work. No squeeze timer is used. The electrical sensing means observes the actual closure of the welding transformer secondary circuit and initiates the weld timer. At the end of the weld time, the weld timer initiates the hold time. At the end of the hold time, the solenoid valve is deenergized. When the electrodes leave the work (opening the transformer secondary circuit), the sensing means initiates the off time. At the end of the off time, the off time timer reenergizes the solenoid valve. Thus, the sequencing is directly related to the closure and opening of the welder electrodes at the two most critical instants during sequencing, that is, the initiation of welding current and the parting of the electrodes. In the embodiment of Fig. 3, the change in the input impedance of the welding transformer primary is employed for indicating the welding electrode positioning.

Referring to Fig. 3, there are shown a pair of welder electrodes 1 energized from a secondary transformer winding 2. Welding current for winding 2 is obtained from the primary transformer winding 3 electrically associated therewith, which in turn is energized through the gaseous discharge paths of ignitrons 4 and 5 from a single phase alternating potential source connected to buses 6 and 7. Buses 6 and 7 are respectively connected to one terminal and the center tap of the secondary transformer winding 8 which is energized from the associated primary transformer winding 9. The voltage developed between the other terminal and the center tap of the secondary winding 8 is applied between buses 10 and 7. Positioning of the welder electrodes 1 is controlled by solenoid valve 11 which is energized through control conductor and the electron discharge paths of thyratrons 12 and 13 from the buses 14 and 15 connected across the primary transformer winding 9. This valve 11 may act through a pneumatic, hydraulic or like system on the welding electrodes as indicated by the dotted line in the drawing.

The sequence control circuit for controlling the welding operation comprises the gaseous electric discharge devices, or thyratrons 16, 17 and 18 having their gaseous discharge paths connected between buses 6 and 7 and thyratrons 19, 20, 21 and 22 having their gaseous discharge paths connected between buses 10 and 7. The sequence control circuit is provided for controlling the weld, hold and off control functions of the welding operation.

Under non-operating conditions, thyratrons 12 and 13 having their gaseous discharge path in series with the operating winding of the solenoid valve 11 across the alternating potential applied to buses 14 and 15 are normally held non-conductive because of the alternating potential bias induced in the secondary transformer windings 23 and 24, connected in the cathode-grid circuits of devices 12 and 13 from the primary winding 25. The voltages induced in the secondary windings 23 and 24 and applied to the grids of devices 12 and 13 are of opposite polarity to that applied to their associated anodes 26 and 27 to maintain these devices in a cut off condition. Thus, with devices 12 and 13 cut off, solenoid valve 11 is unenergized with the result that the welding electrodes 1 are spaced apart. Under these same conditions, ignitrons 4 and 5 having their gaseous discharge paths connected in series with the welding transformer primary winding 3 across the single phase alternating potential applied to buses 6 and 7 are held non-conductive, since, as pointed out below, the igniters associated with the ignitrons are in an open circuit and consequently unenergized. With no current flowing through devices 4 and 5, the welding transformer primary winding 3 is substantially unenergized, since, as pointed out more specifically below, its only connection with buses 6 and 7 is through a resistor of high value connected in shunt to these devices.

Referring now to the sequence control circuit, it is noted that the anode 28 of thyratron 19 is connected to bus 10 through the primary transformer winding 29. Its grid 30 is connected through the secondary transformer winding 31 to the junction between condenser 32 and resistor 33 which are series connected between buses 6 and 10. Since the voltage across resistor 33 leads the voltage applied to bus 6 with respect to bus 7, this leading voltage is also applied to grid 30 of thyratron 19, with the result that for the positive half cycle of the alternating potential applied to its anode 28, device 19 conducts. The resultant current flow through the primary transformer winding 29 induces a negative control potential in the secondary transformer winding 37.

Thyratron 16 has its anode 34 connected through the primary transformer winding 35 associated with its above referred to secondary winding 31 to the bus 6, and its grid 36 connected through the secondary transformer windings 37 and 38 in series to the junction of condenser 39 and resistor 40 which are series connected across the alternating potential developed between buses 6 and 10. Without any voltage being induced in the secondary transformer windings 37 and 38 from their associated primary windings, thyratron 16 would normally conduct during the positive half cycle of alternating voltage applied to its anode 34 because of the connection of its grid 36 between condenser 39 and resistor 40. Elements 39 and 40 serve the same function for device 16 as do 32 and 33 for device 19. However, since device 19 normally conducts during a positive half cycle of voltage applied to its anode, the resultant gaseous discharge current flow through the primary transformer winding 29 induces a negative potential in the secondary transformer winding 37 overcoming the bias available from 39 and 40, thereby maintaining device 16 non-conducting.

Device 17 has its anode 41 connected through an initiating switch 42, normally open, and the primary transformer winding 35 to bus 6, with its control grid 43 connected through a time constant circuit comprising adjustable resistor 44 and condenser 45 to the anode 28 of device 19. With device 19 non-conductive, condenser 45 would have charged through the primary transformer winding 29 and the grid to cathode circuit of device 17 to the potential of bus 10. However, the conduction of device 19 during positive half cycles of its anode voltage because of its grid connection to elements 32 and 33 discharges condenser 45 sufficiently after a time delay to fire thyratron 17, provided its anode circuit is closed by switch 42 to bus 6. Thyratron 17 fires in response to the voltage drop across device 19 which, due to the inductance of its circuit through primary transformer winding 29, carries over into the initial portion of the next half cycle of voltage when the anode voltage of thyratron 17 is positive. This employment of the lagging current flow through a leading device for controlling a lagging device when its anode voltage is positive is further employed in Fig. 3 for devices respectively connected across buses 6, 7 and 7, 10.

Under normal conditions, switch 42 is open, and hence the only conducting device is thyratron 19. If it is desired to start a welding cycle, switch 42 is closed, thereby applying alternating potential to anode 41 of thyratron 17. Depending on the initial charge on condenser 45, and the value of the time constant of the circuit comprising elements 44 and 45, device 17 is fired causing current flow through the primary transformer winding 35. Current flow through the primary winding 35 induces a negative hold off voltage in the secondary transformer winding 31 which overcomes the normal bias available from the circuit of condenser 32 and resistor 33 for grid 30 of thyratron 19, causing this device to be cut off. With thyratron 19 cut off, no current flows through the primary transformer winding 29, with the result that the negative bias normally induced in the secondary winding 37 is removed, and hence current also flows through thyratron 16 and primary transformer winding 35. Current flow through the primary transformer winding 35 also induces a positive potential in its associated secondary windings 46 and 47. The positive potential developed in 46 and 47 overcomes the normal cut off bias supplied to windings 23 and 24, respectively, from the primary transformer winding 25, such that devices 12 and 13 commence conduction, thereby energizing the solenoid valve 11. Solenoid 11 being energized now acts through its associated mechanism to drive the two welding electrodes 1 together toward the work piece.

So far ignitrons 4 and 5 are non-conductive and hence inoperative due to their igniters 48 and 49 not being energized. Devices 20 and 21 are employed to energize the igniters and control the weld time. By having their gaseous discharge paths connected across buses 7 and 10 through the relay coil 50 and the inductive winding 51, respectively, and their control electrodes 52 and 53 connected through the normally unenergized secondary winding 54 to bus 6, devices 20 and 21 are normally held non-conductive. Since device 20 is employed to control the firing of ignitrons 4 and 5, and device 21 is employed to control the weld time, the sequencing action remains halted until an appropriate signal is induced in the secondary winding 54 connected in the grid circuit of these devices. In accordance with the invention, a signal voltage, developed in the secondary winding 54 upon closure of the welder electrodes 1, is employed to operate devices 20 and 21 and hence initiate the flow of welding current and the sequencing controls.

As previously mentioned, ignitrons 4 and 5 are normally held non-conductive since their respective igniters are unenergized. However, a sensory current flows between buses 6 and 7 through the primary winding 3 of the welding transformer by way of the current limiting resistor 55. This resistor 55 is of high value and the principal inductance in its circuit is that of the primary transformer winding 3 which is substantially a pure inductance since its secondary winding 2 is open in the condition where the welding electrodes have not yet closed. As a result of this, an alternating potential is developed between the cathode 56 of diode 57 and bus 7 which leads the voltage available at bus 6 by less than 90° depending on the relative value of the inductance of the primary winding 3 and the resistance 55. These voltage conditions are clearly shown in Fig. 4 of the drawings. The voltage developed between buses 6 and 7 is applied to the primary winding 58 of the transformer 59 which induces a voltage 180° out of phase with that available at bus 6 across its secondary winding 60. The voltage applied across the transformer winding 58 is also applied through the primary transformer winding 61 to the anode 62 of the thyratron 63 having its cathode connected to bus 7. Resistor 64 and condenser 65 are serially connected across the winding 60. The voltage across winding 60 being 180° out of phase with the voltage at bus 6, there is developed a voltage at the junction of resistor 64 and condenser 65 which lags the voltage at bus 6 by an amount more than 90° depending upon the relative values of the elements 64 and 65. This lagging voltage shown in Fig. 4 is applied through resistor 66 to the anode 67 of diode 57. The anode 67 of diode 57 is also connected through resistor 68 to the grid 69 of thyratron 63.

Thus, the resultant voltage available at the grid 69 depends upon the relative amplitudes of the voltages of one polarity applied to the anode 67 of diode 57 over resistor 66 and to the cathode 56 of this diode from the primary winding 3 of the welding transformer. This arrangement of diode 57 insures that the voltage at grid 69 of thyratron 63 is either the voltage developed at the junction of condenser 65 and resistor 64, or across the primary winding of the welding transformer depending upon which is the more negative. This is clearly seen by reference to the voltage curve of thyratron grid 69 shown in Fig. 4. Study of the voltage curves of grid 69 and the anode 62 reveals that the grid 69 of thyratron 63 is negative at the point when the voltage at anode 62 is positive, whereas when the grid goes positive, the anode has a negative potential applied to it. Under these conditions thyratron 63 cannot conduct. The neon lamp 70 connected between grid 69 and the bus 7 is employed to limit the negative potential applied to grid 69. No effort has been made to draw the voltage conditions to scale, use of the curves being made primarily to indicate the phasing involved.

If we assume the solenoid valve 11 has finally acted to drive electrodes 1 into contact with each other, or the work piece, then the voltage developed across primary winding 3 of the welding transformer through the resistor 55 disappears as shown at point 71 in Fig. 4. This is because the secondary winding 2 now has an effective short circuit applied to it, which is reflected in the primary winding 3. As a result of this, the voltage at grid 69 of thyratron 63 now can only follow the voltage available at the junction of resistor 64 and condenser 65. As soon as this voltage goes positive, as, for example, at point 72 in Fig. 4, thyratron 63 begins to conduct since both its grid and anode are energized with a positive potential. Conduction in thyratron 63 is sustained throughout the remaining portion of the applied anode voltage cycle and part way into the negative half cycle because of the inductance of the primary transformer winding 61 connected in circuit with its anode. Thus, thyratron 63 conducts so long as welding electrodes 1 are closed for the time interval shown in cross hatched lines in Fig. 4 during half cycles when its anode voltage is positive.

Conduction of thyratron 63 causes anode current flow through the primary winding 61 which induces a control voltage in the associated secondary winding 54. This induced voltage in winding 54 is in turn applied to grids 52 and 53 of the devices 20 and 21, causing conduction of both devices. Current flow through relay winding 50 connected in the anode circuit of device 20 causes relay contacts 73 to close, thereby energizing the igniters of the ignitrons 4 and 5.

Since now a current path exists from bus 6 through rectifier 74, the closed contacts 73, and rectifier 75 to the igniter electrode 49, ignitron 5 is caused to fire. A similar path exists from bus 7 through the primary winding 3 of the welding transformer through rectifier 76, the closed contacts 73, and the rectifier 77 to the igniter 48, thereby causing ignitron 4 to fire also. Welding current is now applied from the supply conductors through the load conductors to the closed electrodes.

Devices 18 and 22 in the sequence control circuit have their gaseous discharge paths energized from buses 6 and 10 of opposite polarity with anode 78 of device 18 connected to bus 6 through the primary transformer winding 79 and anode 80 of device 22 connected through the primary transformer winding 81 to bus 10. Device 18 is rendered normally non-conductive by having its grid 82 connected through the time constant circuit comprising adjustable resistance 83 and capacitance 84 and inductance 51 to bus 10 while device 22 is rendered normally non-conductive by having its grid 85 connected through the time constant circuit comprising adjustable resistance 86 and capacitance 87 and the primary transformer winding 79 to bus 6. Under normal conditions with thyratrons 21 and 18 non-conductive, capacitances 84 and 87 have been charged to substantially the potential of buses 10 and 6, respectively. Upon conduction of thyratron 21 in response to the voltage induced in winding 54 due to firing of device 63, condenser 84 discharges over a given number of cycles determined by the value of its time constant with resistance 83, thereby causing thyratron 18 to fire. The time taken for this to happen determines the weld time. The resultant current flow through the primary transformer winding 79 induces a negative voltage in the secondary transformer winding 88. This induced negative voltage is developed between bus 7 and the shield grids 89 and 90 of thyratrons 20 and 19. This insures that thyratron 19 remains cut off, while thyratron 20, which has been conducting to insure the flow of welding current is now cut off. As soon as thyratron 20 ceases to conduct, relay winding 50 is deenergized causing contactor 73 to drop out. This removes the firing voltage from the igniters, thereby disabling ignitrons 4 and 5 and halting the flow of welding current.

After a sufficient number of cycles have elapsed subsequent to the start of conduction in thyratron 18, the charge of condenser 87 in the hold time constant circuit has discharged sufficiently to cause thyratron 22 to fire. The resultant current flow through the primary transformer winding 81 connected to its anode 80 induces a negative potential in the associated secondary winding 38 connected through winding 37 to the grid 36 of thyratron 16. This causes thyratron 16 to stop conducting, thereby deenergizing the secondary transformer windings 46 and 47 associated with it, and hence also deenergizing the solenoid valve 11. Thereupon the welder electrodes 1 are driven apart. The halt of current flow through the primary winding 35 also removes the negative hold off potential induced in the secondary transformer winding 31 which has been maintaining thyratron 19 cut off. Thyratron 19 will not conduct, however, until the hold off voltage from transformer secondary winding 88 is removed by devices 21 and 18 being rendered non-conducting in response to device 63 becoming non-conducting upon separation of the welder electrodes 1. Thereafter thyratron 19 may again conduct for a proportion of alternate half cycles as previously mentioned.

The sequencing controls have now gone through one cycle of welding operation. If the switch 42 is open, the circuit remains in its non-operative state as initially explained. However, if the switch has been maintained closed, a new welding cycle is caused to commence after the time delay imposed by the off time circuit 44, 45 provided that the welder electrodes 1 have separated. It should be noted that with potential induced in the secondary transformer winding 54 removed upon separation of the welder electrodes 1, devices 21, 22 and 18 cease conduction and when device 18 becomes non-conducting, the negative hold off voltage applied to grid 90 of device 19 is removed releasing this valve for conduction and the firing of device 17 after the off time delay of circuit 44, 45, provided switch 42 is closed.

Although in the arrangement of Fig. 3, the frequency of the alternating source energizing the welding transformer has been utilized for developing a triggering potential initiating the welding current, the use of different frequencies may be resorted to. The use of a higher frequency such as 500 cycles per second may be preferable since first, the transformer open circuit impedance would be greater for the higher frequency and second, the higher frequency may be fed to the transformer through a coupling condenser which offers high impedance to the power frequency. An arrangement for coupling the high frequency energy into the circuit of Fig. 3 for providing the electrode position sensing feature is indicated in Fig. 5 where the sensing transformer primary winding 91 is connected through condenser 92 and resistor 93 to a source of high frequency waves. The winding 91 is also connected through the power supply frequency wave trap 94 across the primary winding 3 of the welding transformer. Thus, with the welding electrodes 1 apart, the high impedance of the transformer primary winding causes high frequency waves to be induced into the secondary winding 95 from winding 91. The output waves in winding 95 upon rectification by rectifier 96 and resistor 97 are employed to bias off the welding and sequence control circuits, as, for example, devices 20 and 21 of Fig. 3, by applying a negative potential to grids 52 and 53, respectively. Upon closure of the electrodes an effective short circuit is applied across the transformer winding 3 and hence also across the wave trap 44 in series with transformer winding 91, thereby preventing the transfer of high frequency waves to the secondary winding 95. With no high frequency alternating potential induced in winding 95, the cut off bias developed by rectifier 96 disappears, thereby effectively returning grids 52 and 53 of devices 20 and 21, respectively, to ground, so that both devices can conduct and thereby initiate energization of the welding electrodes and operation of the sequencing controls.

I have shown only certain preferred embodiments of my invention by way of illustration. Many modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. A control circuit comprising a transformer having a primary winding and a secondary winding, a pair of normally opened electrodes connected across said secondary winding, means including a resistor for energizing said primary winding with a source of alternating voltage to produce a limited current flow through said primary winding and for producing thereacross a voltage which is out of phase with the supply voltage, means responsive to said out of phase voltage for maintaining said limited current flow, means for closing said electrodes and thereby substantially eliminating said out of phase voltage, and means responsive to the substantial elimination of said out of phase voltage for bypassing said resistor to cause substantially greater current flow in said primary winding.

2. A control circuit comprising a source of high frequency voltage, a source of low frequency voltage, a transformer comprising a primary winding and a secondary winding, a pair of normally parted electrodes connected across said secondary winding, circuit means, normally maintained inoperative, for energizing said primary winding with said low frequency voltage, impedance means coupled to said primary winding for energizing said primary winding with said high frequency voltage, means coupled to said impedance means and responsive to the high frequency voltage developed thereacross only during electrode parting for normally maintaining said circuit means inoperative, and also responsive to substantial disappearance of said high frequency voltage thereacross during electrode closure for operating said circuit means to supply low frequency voltage to said primary winding.

3. An arrangement for coordinating the sequencing controls and electrode positioning in a welding system, comprising first means, normally inoperative, for supplying, when operative, electrode energization to cause welding current flow, second means, normally inoperative, for initiating the operation of a sequencing control comprising separate means, normally inoperative, for controlling the weld time duration, the hold time duration, and the off time duration, means responsive to electrode closure and electrode separation for producing during electrode closure a signal which substantially disappears upon electrode separation, means for initiating operation of said weld time controlling means and for rendering said first means operative in response to said produced signal, means responsive to the termination of said weld time for rendering said first means inoperative and for initiating operation of said hold time controlling means, means responsive to termination of said hold time for supplying energization for causing electrode separation and the substantial disappearance of said signal, and means responsive to said substantial disappearance of said produced signal for initiating operation of said off time controlling means.

4. An arrangement for coordinating the sequencing controls, comprising weld time, hold time, and off time, normally non-initiated, and the electrode positioning in a welding system, comprising means for producing an electrical signal indicative of electrode closing and by its substantial disappearance likewise indicative of electrode separation, means responsive to said signal for supplying electrode energization to produce welding current flow and for initiating the weld time, means responsive to the termination of said weld time for initiating the hold time and for operating said means for supplying electrode energization to prevent welding current flow, means responsive to termination of said hold time for supplying energization for causing electrode separation and said signal substantially to disappear upon electrode separation, and means responsive to substantial disappearance of said signal to initiate said off time.

5. Apparatus for controlling a resistance welding system in accordance with the open and closed positions of the welding electrodes, said apparatus comprising alternating current supply conductors, load conductors for supplying energization to the primary winding of a welding transformer whose secondary winding is connected with the welding electrodes, control conductors for supplying energization to control the closing and opening of the welding electrodes, an electric discharge device having an anode, a cathode, two control elements, and two control element circuits each of which connects a different one of said control elements with its said cathode, means controlling the energization of said control conductors to close and open the welding electrodes, means responsive to operation of said last mentioned means for applying a hold off voltage in the control element circuit of one of said control elements of said electric discharge device so long as said last mentioned means operates to control energization of said control conductors for closing the welding electrodes, means connected with said load conductors for producing a signal so long as the impedance value of a welding transformer connected to said load conductor is low due to the closure of its secondary circuit by closure of the welding electrodes connected thereto, and means responsive to said signal for applying a hold off voltage in the control element circuit of the other of said control electrodes of said electric discharge device.

6. Apparatus for coordinating, in a resistance welding system, the sequence of weld, hold and off times relative to the open and closed positions of the welding electrodes, said apparatus comprising alternating current supply conductors, load conductors for supplying energization to the primary winding of a welding transformer whose secondary winding is connected with the welding electrodes, control conductors for supplying energization to control the closing and opening of the welding electrodes, means for controlling the flow of welding current from said supply conductors to said load conductors, means connected with said load conductors for producing a signal so long as the impedance value of a welding transformer connected to said load conductors is low due to the closure of its secondary circuit by closure of the welding electrodes connected thereto, an electric discharge device having an anode, a cathode, two control elements, and two control element circuits each of which connects a different one of said control elements with its said cathode, means controlling the energization of said control conductors to initiate closing of the welding electrodes and for also applying a control voltage in one of the control element circuits of said electric discharge device which renders said electric discharge device non-conducting, weld, hold and off timers, means responsive to said electric signal occurring upon electrode closure for operating said welding current flow controlling means to supply welding current to the welding electrodes and for also initiating the operation of said weld timer, means responsive to the operation of said weld timer, after its time delay period of operation, for introducing a control voltage in the other control element circuit of said electric discharge device which renders said electric discharge device non-conducting, for again operating said welding current flow controlling means to interrupt the supply of welding current to the welding electrode, and for initiating operation of said hold timer, means responsive to operation of said hold timer, after its time delay period of operation, for eliminating from said one of said control element circuits of said electric discharge device said control voltage rendering said electric discharge device non-conducting to prepare it for anode-cathode conduction subject to the control of its other control element, and for reversely controlling the energization of said controlling conductors to initiate opening of the welding electrodes, means effective upon the disappearance of said signal with the opening of the welding electrodes for eliminating from said other control element circuit of said electric discharge device said control voltage which renders said electric discharge device non-conducting and for also initiating operation of said off timer when said electric discharge device becomes conducting, and means effective upon operation of said off timer, after its time delay period of operation, for controlling the energization of said control conductors to initiate another closing of the welding electrodes and for again applying said control voltage in said one of said control element circuits of said electric discharge device which renders said electric discharge device non-conducting.

7. Apparatus for controlling a resistance welding system in accordance with the open and closed positions of the welding electrodes, said apparatus comprising alternating current supply conductors, load conductors for supplying energization to the primary winding of a welding transformer whose secondary is connected to the welding electrodes, control conductors supplying energization to control the closing and opening of the welding electrodes, means for controlling the flow of welding current from said supply conductors through said load conductors, means for supplying a sensory current to said load conductors for application to the primary of the welding transformer, said means including a resistor connected in shunt with said welding current flow controlling means and in circuit with one of said load conductors, an electric discharge device having an anode, a cathode and a control element, means for applying a voltage of said supply conductors to the anode-cathode circuit of said electric discharge device, means for deriving a first control voltage from said supply conductors which lags by substantially ninety degrees the anode voltage of said electric discharge device, means for deriving a second control voltage from said supplying conductor at points directly responsive to the impedance of the primary winding of the welding transformer connected to said supply conductors, said voltage leading substantially ninety degrees the anode voltage of said electric discharge device when sensory current is supplied through said resistor to the welding transformer and the welding electrodes supplied by the welding transformer are open, and said voltage substantially disappearing when the welding electrodes are closed to complete a welding circuit, means connecting said first and second control voltages between the control element and cathode of said electric discharge device depending on which has the greater amplitude of one polarity, for rendering said electric discharge device non-conducting, means depending on anode-cathode conduction of said electric discharge device for operating said welding current flow controlling means to supply welding current flow through said load conductors for a predetermined time and for also reversely controlling, after said predetermined time of welding current flow, the energization of said control conductors to initiate the opening of the welding electrodes, and means responsive to non-conduction of said electric discharge device upon opening of the welding electrodes and the consequent reapplication of said second control voltage for again controlling the energization of said control conductors to initiate the closing of the welding electrodes.

8. Apparatus for coordinating, in a resistance welding system, the sequence of weld, hold and off times relative to the open and closed positions of the welding electrodes, said apparatus comprising alternating current supply conductors, load conductors for supplying energization to the primary winding of a welding transformer whose secondary is connected to the welding electrodes, control conductors supplying energization to control the closing and opening of the welding electrodes, means for controlling the flow of welding current from said supply conductors to said load conductors, means for supplying a sensory current through said load conductors for application to the primary of the welding transformer connected to said supply conductors, said means including a resistor connected in shunt with said welding current flow controlling means and in circuit with one of said load conductors, an electric discharge device having an anode, a cathode and a control element, means for applying a voltage of said supply conductors to the anode-cathode circuit of said electric discharge device, means for deriving a first control voltage from said supply conductors which lags by substantially ninety degrees the anode voltage of said electric discharge device, means for deriving a second control voltage from said supply conductor at points directly responsive to the impedance of the primary winding of the welding transformer connected to said supply conductors, said voltage leading substantially ninety degrees the anode voltage of said electric discharge device when sensory current is supplied through said resistor to the welding transformer and the welding electrodes supplied by the welding transformer are open, and said voltage substantially disappearing when the welding electrodes are closed to complete a welding circuit, means connecting said first and second control voltages between the control element and cathode of said electric discharge device depending on which has the greater amplitude of one polarity, for rendering said electric discharge device non-conducting, weld, hold and off timers, means depending on anode-cathode conduction of said electric discharge device for operating said welding current flow controlling means to initiate welding current flow through said load conductors and for also initiating operation of said weld timer, means responsive to operation of said weld timer, after its predetermined time delay of operation, for operating said welding current flow controlling means to interrupt the flow of welding current through said load conductors and for also initiating the operation of said hold timer, means responsive to operation of said hold timer, after its predetermined time delay of operation, for controlling the energization of said control conductors to initiate the opening of the welding electrodes, means responsive to non-conduction of said electric discharge device upon opening of the welding electrodes and the consequent reapplication of said second control voltage in its said control element circuit, for initiating the operation of said off timer, and means responsive to the operation of said off timer, after its said predetermined time delay period of operation, for again controlling the energization of said control conductors to again initiate closing of the welding electrodes.

9. Apparatus for coordinating, in a resistance welding system, the sequence of weld, hold and off times relative to the open and closed positions of the welding electrodes, said apparatus comprising alternating current supply conductors, load conductors for supplying energization to the primary winding of a welding transformer whose secondary is connected to the welding electrodes, control conductors supplying energization to control the closing and opening of the welding electrodes, means for controlling the flow of welding current from said supply conductors to said load conductors, means for supplying a sensory current through said load conductors for application to the primary of the welding transformer connected to said supply conductors, said means including a resistor connected in shunt with said welding current flow controlling means and in circuit with one of said load conductors, a first electric discharge device having an anode, a cathode and a control element, means for applying a voltage of said supply conductors to the anode-cathode circuit of said electric discharge device, means for deriving a first control voltage from said supply conductors which lags by substantially ninety degrees the anode voltage of said electric discharge device, means for deriving a second control voltage from said supplying conductor at points directly responsive to the impedance of the primary winding of the welding transformer connected to said supply conductors, said voltage leading substantially ninety degrees the anode voltage of said electric discharge device when sensory current is supplied through said resistor to the welding transformer and the welding electrodes supplied by the welding transformer are open, and said voltage substantially disappearing when the welding electrodes are closed to complete a welding circuit, means connecting said first and second control voltages between the control element and cathode of said first electric discharge device depending on which has the greater amplitude of one polarity, for rendering said electric discharge device non-conducting, a second electric discharge device having an anode, a cathode, two control elements, and two control element circuits each of which connects a different one of said control elements with its said cathode, means for applying a voltage of said supply conductors to the anode-cathode circuit of said second electric discharge device, means controlling the energization of said control conductors to initiate closing of the welding electrodes and for also applying a control voltage in one of the control element circuits of said second electric discharge device which renders it non-conducting, weld, hold and off timers, means depending on anode-cathode conduction of said first electric discharge device for operating said welding current flow controlling means to initiate welding current flow through said load conductors, and for also initiating operation of said weld timer, means responsive to operation of said weld timer, after its predetermined time delay of operation, for operating said welding current flow controlling means to interrupt the flow of welding current through said load conductors, for introducing a control voltage in the other control element circuit of said second electric discharge device which renders said second electric discharge device non-conducting, and for initiating the operation of said hold timer, means responsive to operation of said hold timer, after its predetermined time delay of operation, for controlling the energization of said control conductors to initiate the opening of the welding electrodes and for also eliminating from said one of said control element circuits of said second electric discharge device said control voltage rendering said second electric discharge device non-conducting to prepare it for anode-cathode conduction subject to the control of its other control element, means responsive to non-conduction of said first electric discharge device upon opening of the welding electrodes and the consequent reapplication of said second control voltage in its said control element circuit, for eliminating from said other control element circuit of said second electric discharge device said control voltage rendering said electric discharge device non-conducting and for initiating operation of said off timer when said second electric discharge device becomes conducting, and means effective upon operation of said off timer, after its predetermined time delay of operation, for controlling the energization of said control conductors to initiate another closing of the welding electrodes and for also applying a control voltage in said one control element circuit of said second electric discharge device which renders it non-conducting.

MAURICE E. BIVENS.

REFERENCES CITED

The following references are of record in the file of this patent:

UNITED STATES PATENTS

| Number | Name | Date |
| --- | --- | --- |
| 1,933,936 | Schnetzer | Nov. 7, 1933 |
| 2,014,082 | Fox | Sept. 10, 1935 |
| 2,105,899 | Wright | Jan. 18, 1938 |
| 2,112,716 | Smith | Mar. 29, 1938 |
| 2,493,839 | Thomas | Jan. 10, 1950 |